R. MUNZLINGER.
DUMPING TRUCK.
APPLICATION FILED MAY 24, 1920.

1,387,163.

Patented Aug. 9, 1921.
5 SHEETS—SHEET 1.

Inventor:
Richard Munzlinger,
By Hugh K. Wagner,
Attorney

R. MUNZLINGER.
DUMPING TRUCK.
APPLICATION FILED MAY 24, 1920.

1,387,163.  Patented Aug. 9, 1921.
5 SHEETS—SHEET 2.

UNITED STATES PATENT OFFICE.

RICHARD MUNZLINGER, OF ST. LOUIS, MISSOURI.

DUMPING-TRUCK.

1,387,163.  Specification of Letters Patent.  Patented Aug. 9, 1921.

Application filed May 24, 1920. Serial No. 383,815.

*To all whom it may concern:*

Be it known that I, RICHARD MUNZLINGER, a citizen of the United States, residing at the city of St. Louis, in the State of Missouri, have invented certain new and useful Improvements in Dumping-Trucks, of which the following is a specification.

The object of this invention is to provide rapid and efficient means for dumping or unloading loaded trucks. Another object of this invention is to bring the loaded box of the truck close to the ground and remove the contents from said box in such a manner as to prevent any injury to said contents as in practice it is often necessary to unload such materials as glass, concrete forms, bricks, tile, and many other breakable materials. To accomplish this a box is provided with sides that may be moved across the box at will. This box is so mounted upon the chassis of the motor truck that it may slide off of said truck and to the ground upon skids. An arm is then placed so as to hold the side of the box nearest the truck a predetermined distance therefrom. Obviously this will hold the load stationary. Means for pulling the box from under the load in such a manner as to prevent any injury to the contents of said box, and then returning the box to its normal position upon the chassis of the motor truck, is then provided.

In the accompanying drawings forming part of this specification, in which like numbers of reference denote like parts wherever they occur.

Upon the chassis 1 of a motor truck or other draft vehicle two arcuate channel tracks 2 are mounted. Above these tracks a frame work or bed 3 with rollers 4 is mounted, journaled in the four corners thereof and placed so as to aline with and ride in the arcuate channel tracks 2. Upon this frame work 3 and rigidly attached thereto, arcuate racks 5 are provided, the teeth of which mesh with the teeth of gear wheels 6. The gear wheels 6 are rigidly mounted upon a shaft 7 journaled in a bearing 8, said bearing being mounted upon the chassis 1 of the motor truck. Upon said shaft 7 and spaced from the gear wheels 6 a second gear wheel 9 is provided, mounted to rotate with the shaft 7. Meshing with this gear wheel 9 a pinion 10 is provided, said pinion being mounted upon a shaft 11 which is journaled at 12 upon the motor truck chassis 1. This shaft is rotated by any suitable means. In the present instance a cranking handle 13 is provided, adapted to be operated manually. With this arrangement of parts it will be obvious that rotation of the crank handle 13 will cause the bed 3 to travel along the channel tracks 2 for reasons hereinafter pointed out. Upon the side rails 14 of the chassis 1 brackets 15 are provided for the support of skids hereinafter more fully described. These brackets are formed with a vertical plate 16 that is bolted to said rails 14. Formed integral with said plate 16 and at right angles thereto near the top thereof a second plate 17 is provided. This second or top plate 17 has an L shaped slot 18 formed therein (see Fig. 14). A bracing member 19 of the bracket 15 has a T shaped slot formed therein (see Fig. 16).

Figures 7, 8, 9:
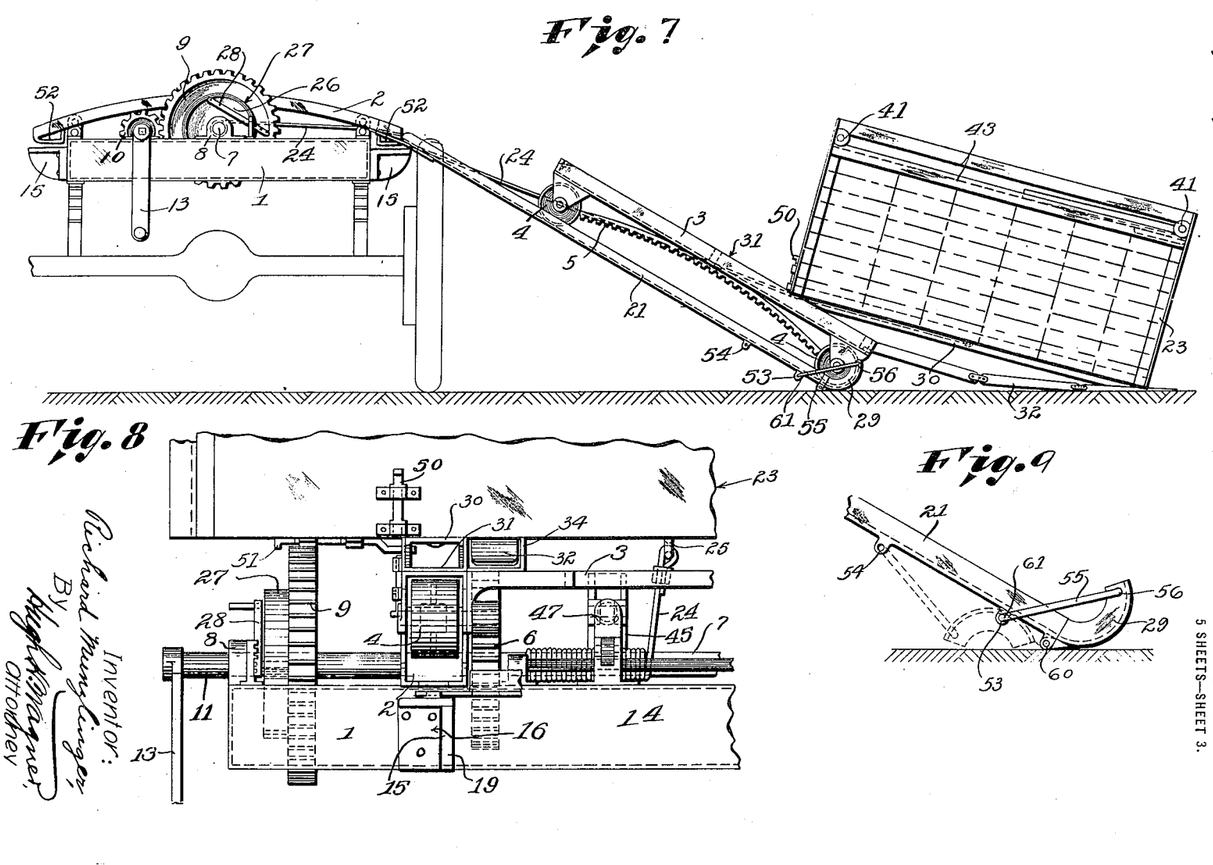
Fig. 7 is a rear view of a motor truck embodying said invention showing the manner of lowering the box of said truck to the ground and the mechanism employed for lowering and returning said box.
Fig. 8 is a fragmental side elevation showing a portion of said invention on an enlarged scale as viewed on the line 8—8 of Fig. 1.
Fig. 9 is a fragmental view showing a portion of one of the skids or track ways showing the stop employed to arrest the downward movement of the bed or box supporting member of the motor truck.
Figure 10:
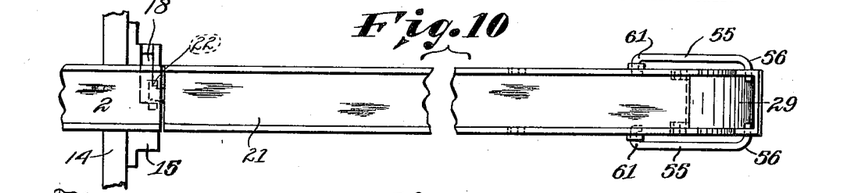
Fig. 10 is a top plan view of one of the above mentioned skids or trackways showing the manner of mounting said skids or trackways upon the chassis of the motor truck.
Figure 11:
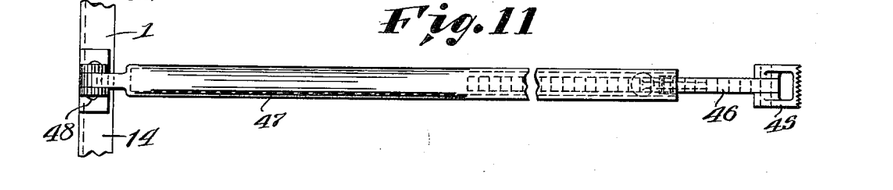
Fig. 11 is a detail illustrating the adjustable arm that coöperates with the sides of the box of the motor truck in the unloading operation.
Figures 12, 13, 14, 15, 16:
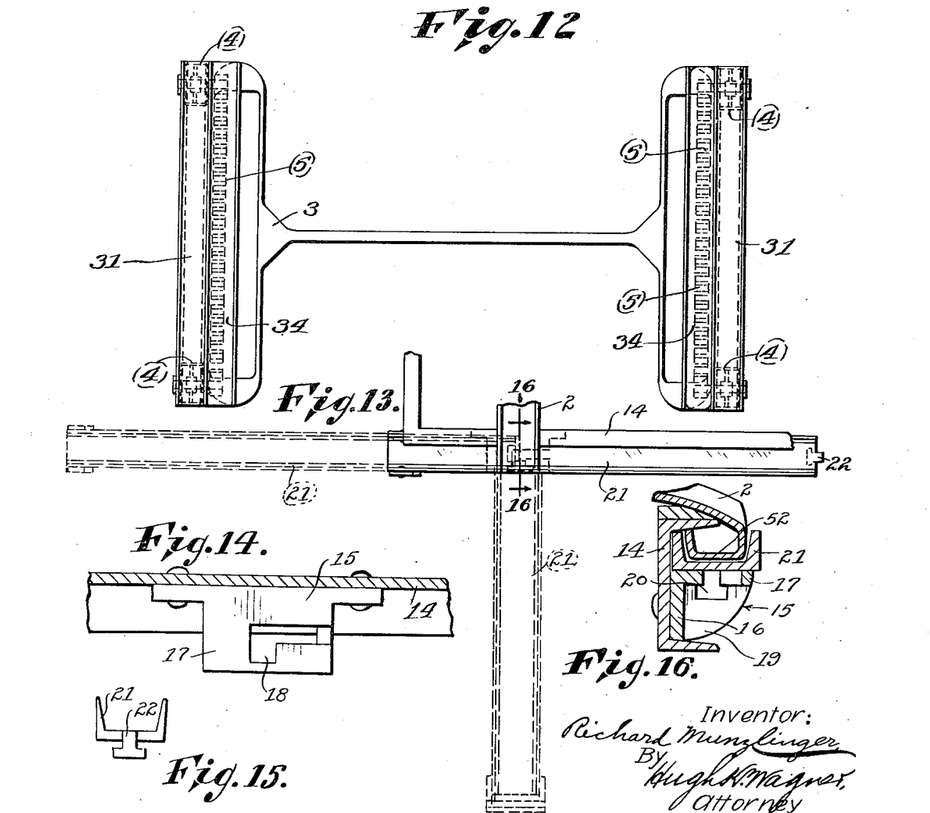
Fig. 12 is a detail top plan view of the movable bed member on which the box of the motor truck is mounted.
Fig. 13 is a fragmental view showing in full lines the position of the skids or trackways when not in use and in dotted lines the positions that said skids assume when it is desired to lower and remove the contents or load of the motor truck.
Fig. 14 is a fragmental top plan view showing a portion of the motor truck chassis and showing one of the brackets employed in the mounting of the skids or trackways.
Fig. 15 is an end elevation of one of the channel tracks.
Fig. 16 is a section taken on the line 16—16 of Fig. 13.

The skid members aforementioned are formed of channel members 21 having a downwardly projecting T shaped tongue 22 formed on the end thereof (see Fig. 15). This tongue projects downwardly and is adapted to extend through the slot 18 in the bracket 15 when the skid is in use. The horizontal portion of the T shaped tongue 22 is substantially wider than the slot 18 while the vertical portion of said tongue 22 is of a width to permit it to slide freely within the slot 18. With this construction the tongue 22 of the skid 21 may move within the slot 18 but may not be removed therefrom. When it becomes necessary to unload material from the box 23 of the motor truck the skids 21 are swung into the position shown in Fig. 7. When in this position the skids 21 aline with the arcuate channel tracks 2. The crank handle 13 is then rotated and the bed 3 moves along and out of the channel track 2 and onto the skids 21. As the rack 5 on the bed 3 moves out of mesh with the pinion 6, cables 24 control the progress of the bed 3 and the box 23 down the skids 21. Cables 24 are wound around, and have one of their ends fastened upon, the shaft 7, as shown in Fig. 8. The other ends of said cables 24 are attached to the box with staples 25. With this arrangement of parts it is obvious that the travel of the loaded box 23 down the skids 21 may be retarded by restricting the rotation of the shaft 7. To accomplish this a brake drum 26 is provided, mounted upon the shaft 7 so as to rotate therewith.

Figures 18, 19, 20:
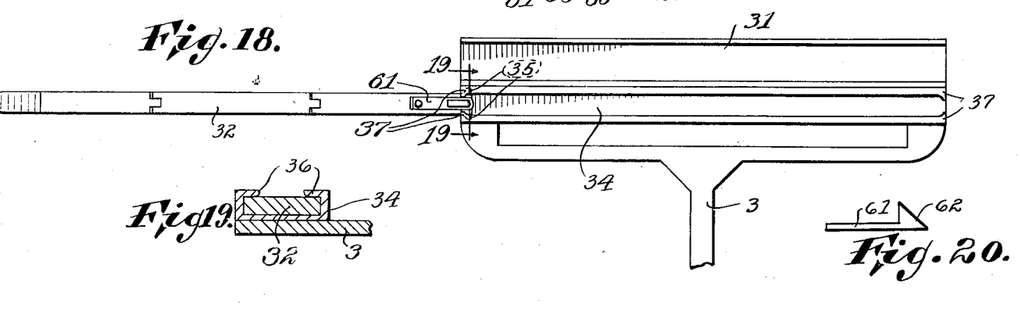
Fig. 18 is a fragmental top plan view showing a portion of the movable box mounting or bed showing the manner of mounting the link skid therein.
Fig. 19 is a section taken on the line of 19—19 of Fig. 18.
Fig. 20 is a fragmental detail showing a portion of the spring pressed tooth that is mounted in the link skids.

Coöperating with this brake drum the usual brake band 27 is provided, said band being provided with means for tightening it upon said brake drum 26, such as a hand lever 28. As the bed 3 carrying the box 23 reaches the ends of the skids 21 a stop 29 is provided that lies in the path of the rollers 4 upon the bed 3. This prevents the bed 3 from traveling beyond the ends of the skids 21. This leaves the box 23 in an inclined position above the ground line an appreciable distance. The box is now lowered to the ground line as follows: The cable 24 is allowed to continue unwinding and the box 23 moves on and off of the bed 3 and out upon the ground. In order to do this it is necessary to mount the box 23 upon the bed 3 so that it may slide off of the bed 3. Projecting downwardly from the bottom of the box 23 tongues or ridges 30 are provided. These tongues 30 slide within channel tracks 31 upon the bed 3. As it is often necessary to unload contents of the box 23 on uneven surfaces a smooth trackway for said box in the form of a link-skid 32 is provided. This skid 32 is normally held in a channel 34 upon the bed 3, said channel 34 being of substantially the same length as the link-skid 32. This skid 32 is provided at one end with projections 35 (see Fig. 18). These projections ride within the channel 34 and under the overhanging edges 36 of said channel 34. The sidewalls of the channel 34 are bent inwardly as at 37. This partial closing of the channel 34 prevents the link-skid 32 from sliding completely out of the channel 34. After the box 23 with its contents has reached the ground line, means for removing said load in such a manner as to prevent the breakage of any of the contents of said box 23 is provided. This is accomplished by withdrawing the box 23 out from under the material 38 to be unloaded. The side members 39 are mounted within the ends 40 of the box 23 so that they may be moved from one side of the box to the other. To accomplish this rollers 41 are provided, mounted upon the top corners of the side members 39.

Figure 1:
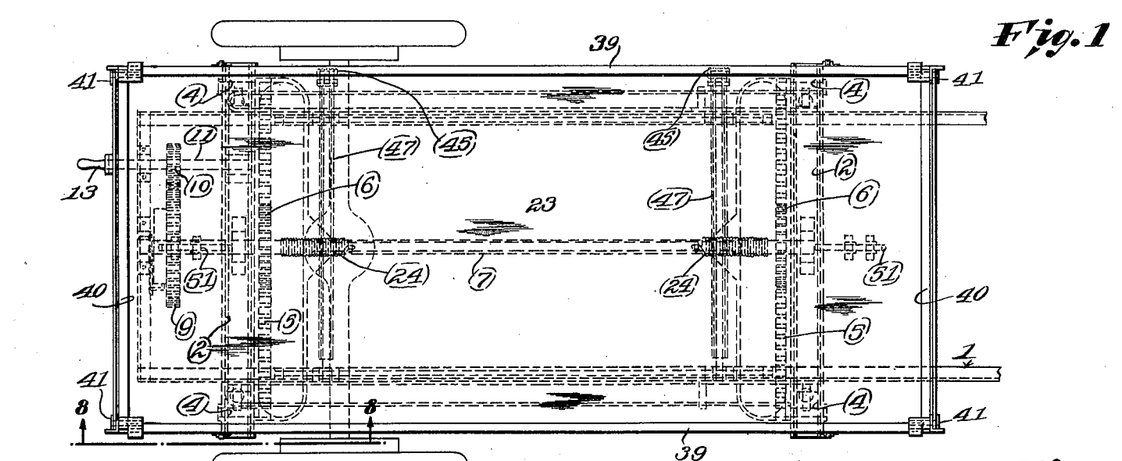
Figure 1 is a top plan view of the rear portion of a motor tuck showing said invention applied thereto.
Figure 2:
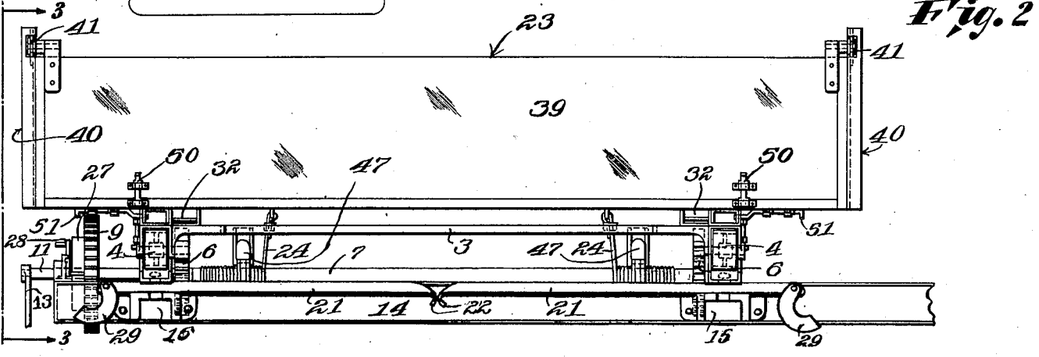
Fig. 2 is a side elevation of the rear portion of a motor truck showing the manner of mounting the box of the truck upon the chassis of said truck.
Figure 3:
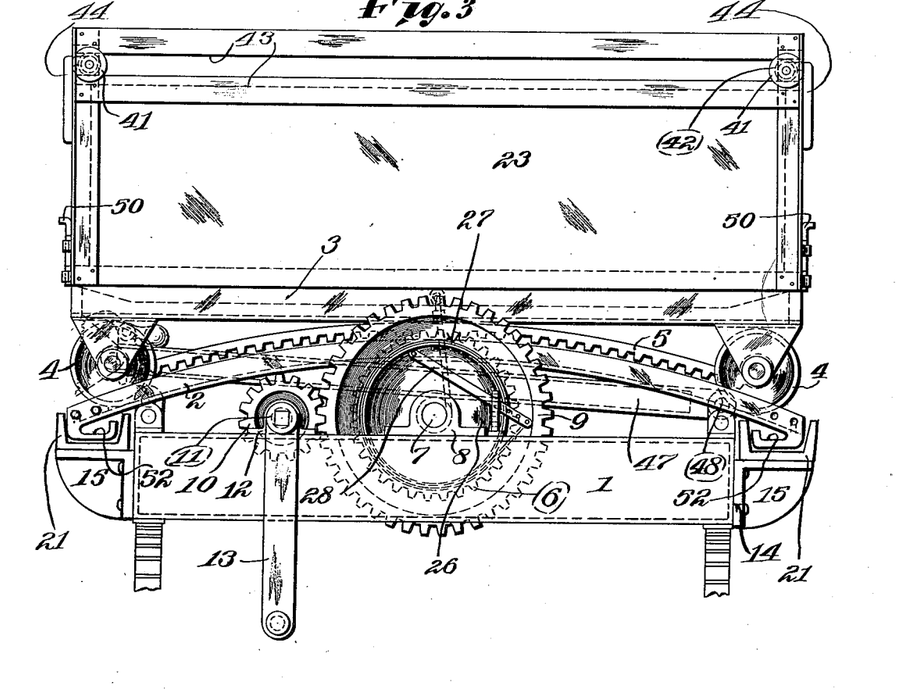
Fig. 3 is a rear elevation of the upper portion of a motor truck further illustrating the mounting of the box of the motor truck upon the chassis of said truck as viewed on the line 3—3 of Fig. 2.
Figure 4:
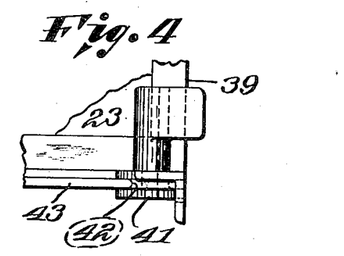
Fig. 4 is a fragmental top plan view of a portion of the box of the motor truck showing the manner of mounting the sides of said box.
Figure 5:
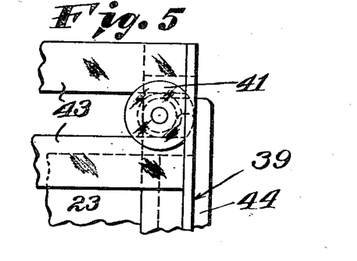
Fig. 5 is a fragmental elevational view further illustrating the manner of mounting said side members.
Figure 6:
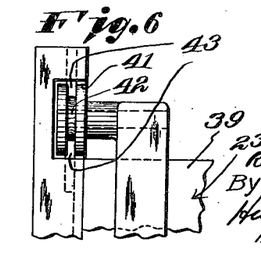
Fig. 6 is a fragmental elevational view of said mounting of the box sides as viewed from the side of the motor truck.

These rollers 41 are grooved as at 42. This groove registers with and moves along track members 43, said track members extending the entire width of the box 23. Upon the sides 39 and near the top thereof stirrups 44 are mounted. These stirrups accommodate a shoe 45, said shoe being pivotally mounted upon an arm 46 which is slidably mounted within a sleeve 47. This sleeve 47 is pivotally mounted at 48 upon the chassis 1 of the motor truck. The lower side of the arm 46 is formed with ratchet teeth which register with a pawl 49 which is normally pressed into said teeth by any suitable means. This pawl 49 is pivotally mounted at 50 at inner end of the sleeve 47. With this arrangement of parts it is obvious that when the shoe 45 is placed in the stirrup 44 and the pawl 49 is set against the ratchet teeth on the arm 46, the side 39 of the box 23 will be prevented from moving toward the motor truck. The ratchet teeth upon the arm 46 together with the pawl 49 make this device adjustable to accommodate variations in the distance between the chassis of the truck and the stirrup 44. The box 23 is then pulled back upon the bed 3 by the cable 24 which is now rewound upon the shaft 7 by a reverse turning of the crank handle 13. Previous to pulling the box 23 back upon the bed 3 the latches 50 are unlatched, which are mounted near the bottom portion of the sides 39 of the box 23. This permits the sides 39 to be swung outwardly and permits them to travel along their trackways 43 upon their rollers 41. Thus when the box 23 is pulled back upon the bed 3 the shoe 45 upon the arm 46 will hold the side 39 of the box 23 stationary and also hold the material 38 within the box 23 stationary while the box 23 is being withdrawn from under said material. This operation unloads the material 38 from the box 23 with no appreciable jar and prevents any injury to said material 38. After the material 38 is removed from the box, the pawl 49 is rocked upon its pivot 50 manually and withdrawn from the ratchet teeth on the arm 46. This permits the arm 46 to be thrust back and into the sleeve 47. The outer end of sleeve is then swung upwardly about its pivot 48 and assumes the position shown in Fig. 3 when not in use. The box 23 is then drawn up on the bed 3 and secured with any suitable means such as a latch 51 (see Fig. 8). The rear skid 21 is then raised to a level of the chassis and swung to the rear of the truck, as shown by the dotted lines in Fig. 13. When in this position the rear skid 21 alines with and is parallel to the side rail 14 of the chassis 1. The ends of the arcuate track 2 extend and are pressed downwardly to form a guide member or tongue 52 as shown in Figs. 3 and 16. After the skids 21 are in the position mentioned above they are pressed forward. The tongue 22 of the skids 21 is permitted to slide out of the bracket 17 owing to the slot 18 and the slot 20 in said bracket. The skid then assumes the position shown in Figs. 3 and 13. The channel 14 of the chassis 1 and the extended portion 52 of the track 2 prevents any sideward movement of the skid. The second skid 21 that is mounted nearer the front of the truck is returned in a similar manner except that it is swung forward and then backward and assumes the position shown in Fig. 2.

This is the position of the skids 21 when not in use. The stop 29 of the skids 21 may be constructed as shown in Fig. 9. Upon the skid 21 two staples 53 and 54 are mounted, adapted to receive the hook 55 which is pivotally mounted at 56 in the stop 29. This stop 29 is pivoted as at 60 so that the hook end 61 of the hook 55 may be withdrawn from the staple 53 and the stop 29 swung into the dotted position shown in the drawing. When in this position the hook end 61 of the hook 55 is pressed into and received by the staple 54. If it is desired to empty the contents of the box 23 upon either side of the motor truck a duplicate mechanism upon the other is provided.

The operation of this machine will now be briefly described.

Figure 17:
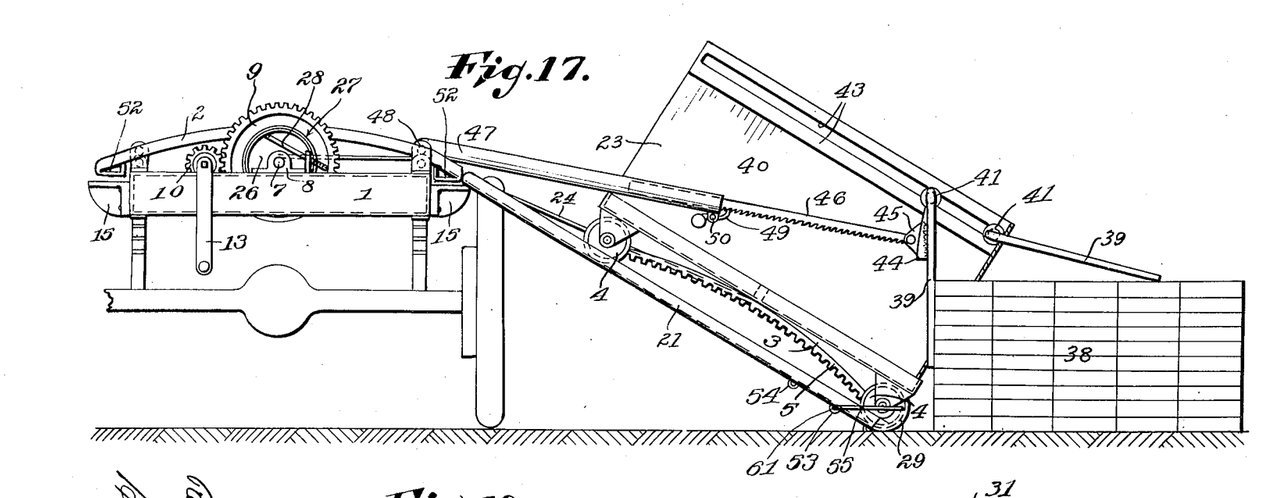
Fig. 17 is a rear view of a motor truck embodying said invention showing the method of dumping the load after said load has been lowered.

Assuming that the motor truck is at a stand-still at the place selected for the unloading operation, the operator unlatches the latch 51 and withdraws the rear skids 21 rearwardly until the tongue 22 enters the slot 18 in the bracket 15. It is then swung in a position to aline with the arcuate track 2 as shown in Figs. 7 and 17. A second or forward skid is pulled forwardly until its corresponding tongue reaches the slot 18 in the similar bracket 15. The outer end of the skid is then swung outwardly and downwardly until it alines with the forward arcuate track 2 of the bed 3. The crank handle 13 is then rotated causing the bed 3 to move toward the skids 21 along the arcuate channel track 2. As the teeth of the rack 5 pass out of mesh with the gear wheel 6 the weight of the loaded box 23 mounted upon the bed 3 tends to propel the bed 3 down the skids 21 until the stop 29 prohibits further movement of the bed 3. This movement is controlled by a breaking action applied to the shaft 7 upon which the cable 24 is wound. After the bed 3 is stopped by the stop 29 the operator draws the link skids 32 out along the ground to the position shown in Fig. 7. The shoe 45 is then placed in the stirrup 44 and the pawl 49 is set to lock the arm 46 against inward movement of said arm. The sides 39 are then unlatched and the box 23 drawn out from under the load 28 and back upon the bed 3. This movement of the box 23 is caused by rotating the handle 13 so as to cause the rewinding of the cable 24 upon the shaft 7. After the box 23 has been drawn out from under the load 38 the pawl 49 is withdrawn from the ratchet teeth of the arm 46 and said arm is pressed into the sleeve 47. The sleeve 47 is then swung into the position shown in Fig. 3. The rewinding operation is continued until the box 23 reaches the position shown in Fig. 3. The latch 51 is then set so as to hold the box 23 in this position. The sides 39 of the box 23 are then returned to their normal position and latched with the latches 50. A spring pressed latch 61 is mounted in the end of the link 32. This latch has an upwardly projecting tooth 62 (see Fig. 20). This tooth passes under the box 23 in a depressed position but springs upwardly after passing the edge of the box; this prevents any accidental withdrawing of the link skids 32 in one direction and the projections 37 prevent any movement of said skid 32 in the other direction. The skids 21 are then returned to the position shown in Fig. 2 and the link skids 32 are forced back into their channel housings 34.

The operation of this dumping mechanism may be either by muscular power or by power derived from an engine or the like or other source.

The truck and dumping apparatus are so constructed that the load may be dumped to either the right side or to the left. A great advantage inheres in the ability to dump either to the left-hand or the right-hand, because in building operations or in any other location where things are to be dumped, there may be a suitable space on the left-hand or the right-hand of a roadway or the like, but not upon the other. If it is possible to dump on either hand, a choice can be exercised at will, and the vacant space may be utilized whether it is on one side or the other, and this, too, without the trouble of backing in in preference to driving in forwardly.

One great advantage arising from this dumping mechanism being arranged to dump to the side instead of to the rear, as heretofore common, is that the load is not dumped in a run-way or roadway, but off to one side. In common practice, where the material is dumped to the rear of a cart or truck, it is necessary immediately to have a gang of men to remove the load out of the passage way, which is frequently inconvenient and sometimes impossible. The present truck, however, permits the dumping of the load to one side of the roadway or passage way, where it can stay until it is convenient to remove it.

This truck is especially designed and intended for the carriage and dumping of particularly frangible material, such, for instance, as bricks, tiles, plate-glass, and the like, and is adapted to dump the whole load without danger or disturbance, instead of in the careless manner in which a load of coal may be dumped.

Having thus described this invention, I hereby reserve the benefit of all changes in form, arrangement, order, or use of parts, as it is evident that many minor changes may be made therein without departing from the spirit of this invention or the scope of the following claims.

I claim:

1. In a machine of the character described, the combination of a motor truck having a movable box mounted thereon, means for conveying said box to the ground-line, means for withdrawing said box from under the load therein, and means for holding said load in a stationary position while said box is withdrawn.

2. The combination with a support, of a load carying box movable thereon and having slidable walls, a raising and lowering device for said box, and means to hold one of said walls and the load in a relatively stationary position during the initial return movement of the box.

3. In a machine of the character described, the combination of a motor truck having arcuate track members mounted thereon, a bed member movably mounted in said track members, a box mounted on said bed member, and means for moving said bed member along said arcuate tracks.

4. In a machine of the character described, the combination of a motor truck having arcuate track members mounted thereon, a bed member supporting a box member, said bed being mounted to move along and out of said arcuate tracks, and skid members mounted to aline with said tracks and inclined downwardly so as to permit the pasage of said box and bed members down said skids.

5. In a machine of the character described, the combination of a motor truck having a bed movably mounted thereon, a box slidably mounted upon said bed member, skids mounted upon the sides of said truck so as to permit the lowering of the bed and box members close to the ground, link-skid members withdrawably mounted in said bed members, and means for permitting said box member to slide along said link-skids.

6. In a machine of the character described, the combination of a motor truck, a box member mounted thereon, means for lowering said box member to the ground, and movably-mounted side members of said box adapted to facilitate the removal of the load from said box.

7. In a machine of the character described, the combination of a motor truck having a box member removably mounted thereon, means for lowering said box member to the ground-line, and means for holding the inner side member of the box against the load of said box so that the load will remain in a stationary position while said box is being drawn out from under said load.

8. In a machine of the character described, the combination of a motor truck, a removable box mounted thereon, skids for lowering said box to the ground, a slotted bracket mounted upon the chassis of said truck, and a tongue formed on said skids adapted to coöperate with said bracket so that said skids may be quickly swung into position for use and easily returned to a position parallel with, and within the channel of, the side rails of the chassis of said motor truck.

9. In a machine of the character described, the combination of a motor truck having a removable box mounted thereon and a bed supporting said box, said bed having a plurality of channels or sliding ways mounted thereon adapted to coöperate with a plurality of projecting tongues upon the bottom of said removable box forming a slidable mounting for said box upon said bed.

10. The combination with a support, of a load carrying box movable thereon and having slidable walls, a raising and lowering device for said box, and means to hold one of said walls and the load in a relatively sationary position during the initial return movement of the box, said means comprising an extensible member connected to said support.

11. The combination with a load carrying box having stationary and movable walls, and means to hold one of said walls in engagement with the load during the lateral withdrawal of the box.

12. In a machine of the character described, the combination of a motor truck having a removable box mounted upon a supporting bed, means for lowering said bed and said box, means for removing said box from said bed, and link-skids housed within said bed adapted to be partially drawn out along the ground to form smooth track-ways for said removable box after said box leaves said bed.

13. In a machine of the character described, the combination of a motor truck having a removable bed mounted thereon, a plurality of link-skids housed within said bed, projections on said skids adapted to engage projections at that end of said housings so as to prevent the entire removal of said link-skids from said housings.

14. In a machine of the character described, the combination of a motor truck having a removable bed mounted thereon and link-skids mounted therein, said skids, having a spring-pressed projection adapted to engage the lower edge of a box mounted on said bed so that said link-skids may not be accidentally moved.

15. In a machine of the character described, the combination of a motor truck having a removable bed supporting a box of said motor truck, skids to permit said bed and box to be lowered to the ground, a rack mounted upon said bed, a shaft mounted upon the chassis of said truck, a pinion meshing with the racks on said bed and mounted upon said shaft so as to rotate therewith, a plurality of cables wound around said shaft having one of their ends attached thereto and their other ends attached to the box of the truck, said cables operating to permit the downward movement of the said motor truck box to be controlled after the teeth of the racks mounted on said bed have left the teeth of the pinions mounted on said shaft.

16. In a machine of the character described, the combination of a motor truck having a removable bed mounted thereon, a rack mounted upon said bed, pinions mounted upon a shaft and meshing with said rack, a brake-drum mounted upon said shaft, a brake-band operating upon the periphery of said brake drum, and means for actuating said brake-band.

17. In a machine of the character described, the combination of a motor truck having a removable box mounted thereon, means for lowering said box to the ground, movable side members mounted upon said box, latches to secure said sides, and a plurality of adjustable arms to coöperate with said sides to hold the load of said box in a stationary position during dumping operations.

18. In a machine of the character described, a motor truck having a removable box mounted thereon, means for lowering said box from said truck, movable side members mounted on said box, stirrups mounted on said side members adapted to receive shoes mounted upon arms, ratchet teeth formed upon said arms, a plurality of sleeves pivotally mounted upon the chassis of said motor truck, said sleeves forming housings for said arms, and pawls mounted upon said sleeves adapted to engage the ratchet teeth of said arms to hold the arms and shoes mounted thereon a predetermined distance from the chassis of the said motor truck.

19. In a machine of the character described, the combination of a motor truck having a removable box mounted thereon, movable sides mounted on said box, and rollers mounted upon said sides adapted to roll along tracks formed in the ends of said box.

20. In a machine of the character described, the combination of a motor truck having a removable box mounted thereon, skids mounted upon the chassis of said motor truck, stops pivotally mounted on said skids, a hook pivotally mounted in said stop adapted to engage staples mounted in said skids, said staples being so placed as to permit the stops to be held in either an operative or inoperative position.

21. A load carrying box comprising relatively stationary and movable walls, rollers slidably connecting said movable walls to said stationary walls, and means whereby the box may be withdrawn from the load.

In testimony whereof I hereunto affix my signature.

RICHARD MUNZLINGER.